United States Patent [19]
Nakamura et al.

[11] Patent Number: 4,871,498
[45] Date of Patent: Oct. 3, 1989

[54] PROCESS FOR PREPARATION OF GRANULAR STABILIZER FOR CHLORINE-CONTAINING POLYMERS

[75] Inventors: Seiichi Nakamura; Mamoru Saito; Toshiaki Sugawara, all of Tsuruoka, Japan

[73] Assignee: Mizusawa Industrial Chemicals, Ltd., Osaka, Japan

[21] Appl. No.: 136,536

[22] Filed: Dec. 22, 1987

Related U.S. Application Data

[60] Continuation of Ser. No. 812,521, Dec. 23, 1985, abandoned, which is a division of Ser. No. 639,068, Aug. 9, 1984, Pat. No. 4,659,506.

[51] Int. Cl.$^4$ .......................... B29B 9/02; B29B 9/08
[52] U.S. Cl. .................... 264/115; 264/117; 264/118; 264/122; 264/131; 264/140
[58] Field of Search ............... 264/115, 122, 131, 68, 264/118, 117, 123, 126, 140

[56] References Cited

U.S. PATENT DOCUMENTS

| | | | |
|---|---|---|---|
| 3,668,144 | 6/1972 | Pearson | 252/400 |
| 3,836,618 | 9/1974 | Stevens | 264/101 |
| 4,267,084 | 5/1981 | Mizutani et al. | 524/527 |
| 4,310,483 | 1/1982 | Dörfel et al. | 264/117 |
| 4,329,182 | 4/1982 | Sugahara et al. | 524/399 |
| 4,446,086 | 5/1984 | Molenaar et al. | 264/118 |
| 4,591,452 | 5/1986 | Worschech et al. | 252/400 |

FOREIGN PATENT DOCUMENTS

| | | |
|---|---|---|
| 3554 | 3/1966 | Japan . |
| 47138 | 12/1978 | Japan . |
| 36932 | 11/1979 | Japan . |

Primary Examiner—Jan H. Silbaugh
Assistant Examiner—Mary Lynn Fertig
Attorney, Agent, or Firm—Sherman and Shalloway

[57] ABSTRACT

A granular stabilizer for chlorine-containing polymers, which is formed by granulating a hardly fusible or infusible powdery stabilizer for chlorine-containing polymers or a mixture of said powdery stabilizer with a powdery stabilizer aid through an organic solid binder or dispersion medium, wherein respective primary particles of said powdery stabilizer or said powdery mixture are surface-treated with the organic solid binder or dispersion medium in an amount of 2 to 15 parts by weight per 100 parts by weight of said powdery stabilizer or said powdery mixture, which is smaller than the critical liquid absorption of said powdery, and said primary particles are granulated into particles having an average particle size of 0.1 to 2 mm by fusion bonding of the surface treatment layers of the organic solid binder or dispersion medium. This granular stabilizer is prominently excellent in the dispersibility in a chlorine-containing polymer, the uniformity of the composition, the scattering resistance, the flowability and the blocking resistance, though the starting powdery stabilizer is granulated with a much reduced amount of the solid binder or dispersion medium.

13 Claims, 3 Drawing Sheets

PROCESS FOR PREPARATION OF GRANULAR STABILIZER FOR CHLORINE-CONTAINING POLYMERS

This application is a continuation of Ser. No. 812,521 filed Dec. 23, 1985, now abandoned, which in turn is a division of Ser. No. 639,068 filed Aug. 9, 1984, now U.S. Pat. No. 4,659,506 which issued Apr. 21, 1987.

BACKGROUND OF THE INVENTION (1) Field of the Invention:

The present invention relates to a granular stabilizer for chlorine-containing polymers and a process for the preparation thereof. More particularly, the present invention relates to a granular stabilizer for chlorine-containing polymers, which is excellent in the dispersibility in a resin, the uniformity of the composition, the resistance to dusting or scattering, the flowability and the blocking resistance even though it is formed by granulating a hardly fusible or infusible stabilizer powder with use of a very small amount of a binder or dispersion medium, and a process for the preparation of this granular stabilizer.

(2.) Description of the Prior Art

A stabilizer such as tribasic lead sulfate is incorporated into a chlorine-containing polymer such as a vinyl chloride resin so as to improve the thermal stability thereof. In this case, a hardly fusible or infusible stabilizer should be as fine as possible in view of the desire for dispersibility in a resin, however fine powder involves a problem of scattering. Accordingly, the hardly fusible or infusible stabilizer is widely handled in the form of granules.

For example, Japanese Patent Publication No. 3554/66 proposes a process for the preparation of a lubricating stabilizer for a vinyl chloride resin which comprises adding a high-melting-point powdery stabilizer, infusible at the processing temperature for a vinyl chloride resin or a lower temperature, to a melt of a metal soap which is to be incorporated as a lubricating stabilizer at the step of processing a vinyl chloride resin, mixing them homogeneously to form a solid solution, and shaping the solid solution into granules or small masses. According to this process, the problem of scattering is overcome, and this process is prominently advantageous in that a so-called one-package stabilizer having a uniform composition can be provided. In order to granulate the powdery stabilizer by using the metal soap melt as the binder, it is necessary to use the metal soap in such a large amount as at least ⅓ part by weight of the powdery stabilizer. Accordingly, if this granular one-package stabilizer is incorporated in a vinyl chloride resin in an amount sufficient to attain an intended stabilizing effect, the amount of the metal soap, such as lead stearate, becomes excessive and at the step of processing the vinyl chloride resin, precipitation of the metal soap is often caused. Therefore, according to the granulation process using a binder which is softened at the resin processing temperature, it is difficult to provide a granular one-package stabilizer in which the mixing ratio of a powdery stabilizer is increased.

A granular one-package stabilizer containing a powdery stabilizer at a relatively high mixing ratio has also been known. For example, in Japanese Patent Publication No. 47138/78, we have proposed a composition comprising a lead pigment, such as tribasic lead sulfate, affined with a liquid plasticizer, such as dioctyl phthalate, in a specific amount relative to the critical liquid absorption of the pigment. This composition has a reduced powder-scattering property and a flowability suitable for handling and is advantageous in that the mixing ratio of the powdery additive in the composition can be increased. However, this composition is defective in that the shape and size of particles of the final composition are not uniform, the mechanical strength of the particles is ordinarily low, and blocking is caused more or less.

Furthermore, Japanese Patent Publication No. 36932/79 discloses a granular stabilizer comprising cores containing a lubricant as a continuous phase and a powdery stabilizer as a dispersed phase and shells formed on the surfaces of the cores, which shells are composed of a powdery stabilizer and a plasticizer in an amount smaller than the critical liquid absorption. This granular stabilizer is advantageous over the first-mentioned granular stabilizer in that the powdery stabilizer can be incorporated at a higher mixing ratio. However, this granular stabilizer is still insufficient in that the blocking tendency cannot completely be eliminated and the dispersibility of the powdery stabilizer into resins is low.

Moreover, Japanese Patent Publication No. 21819/72 disclosed a process in which several stabilizers, at least one of which is a fusible substance, are sinter-granulated without melting said fusible substance by using a powder blender provided with a rotor rotated at a high speed. If this sintering granulation is carried out, a homogeneous granulation product cannot be obtained unless the fusible substance is used in a considerable amount.

SUMMARY OF THE INVENTION

It is therefore a primary object of the present invention to provide a granular stabilizer which is excellent in the dispersibility in a resin, the uniformity of the composition and the resistance to dusting or scattering, the flowability and the blocking resistance, though it is formed by granulating a stabilizer powder with use of a very small amount of a solid binder or dispersion medium, and a process for the preparation of this granular stabilizer.

Another object of the present invention is to provide a process in which a granular stabilizer can be prepared in a high yield while preventing segregation of the components or heterogeneous granulation even with use of a very small amount of a solid binder medium.

Still another object of the present invention is to provide a process in which the above-mentioned granular stabilizer can be prepared with a good operation adaptability at a high productivity.

In accordance with one aspect of the present invention, there is provided a granular stabilizer for chlorine-containing polymers, which is formed by granulating a hardly fusible or infusible powdery stabilizer for chlorine-containing polymers or a mixture of said powdery stabilizer with a powdery stabilizer aid through an organic solid binder or dispersion medium, wherein respective primary particles of said powdery stabilizer or said powder mixture are surface-treated with the organic solid binder or dispersion medium in an amount of 2 to 15 parts by weight per 100 parts by weight of said powdery stabilizer or said powdery mixture, which is smaller than the critical liquid absorption of said powder, and said primary particles are granulated into particles having an average particle size of 0.1 to 2 mm by fusion bonding of the surface treatment layers of the organic solid binder or dispersion medium.

In accordance with another aspect of the present invention, there is provided a process for the preparation of a granular stabilizer for chlorine-containing polymers, which comprises the steps of mixing a hardly fusible or infusible powdery stabilizer for chlorine-containing polymers or a mixture of said powdery stabilizer with a powdery stabilizer aid, under pulverizing conditions with an organic solid binder or dispersion medium in an amount of 2 to 15 parts by weight per 100 parts by weight of said powdery stabilizer or said powdery mixture, which is smaller than the critical liquid absorption of said powder, to surface-treat respective primary particles of said powder with said organic solid binder or dispersion medium, and granulating the surface-treated powder into particles having an average particle size of 0.0 to 2 mm at a temperature higher than the melting point of the organic solid binder or dispersion medium.

DETAILED DESCRIPTION OF THE PREFERRED EMBODIMENTS

Figure 2:
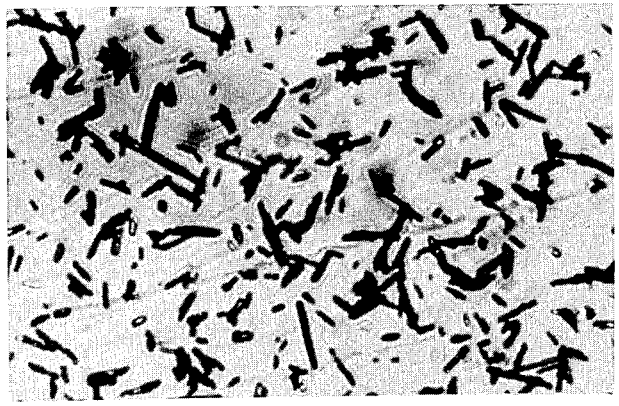
FIG. 2 is a microscope photograph (600 magnifications) illustrating the particle structure of a product obtained by subjecting tribasic lead sulfate shown in FIG. 1 to a pulverizing treatment without addition of an organic solid binder or dispersion medium.

One of important features of the present invention is based on the novel finding that when a hardly fusible or infusible powdery stabilizer for chlorine-containing polymers or a mixture of said powdery stabilizer and a powdery stabilizer aid (often referred to as "powdery stabilizer" hereinafter) is mixed under pulverizing conditions with an organic solid binder or dispersion medium melting at the processing temperature for chlorine-containing polymers (often referred to as "binder medium" hereinafter), respective primary particles of said powder are effectively surface-treated with the binder medium even if the amount of the binder medium is 2 to 15 parts by weight, especially 4 to 10 parts by weight, per 100 parts by weight of the powdery stabilizer and is smaller than the critical liquid absorption of the stabilizer powder.

According to any of the conventional techniques of granulating stabilizers, secondary particles of a powdery stabilizer are integrated with the granulation product through a binder medium acting also as the dispersion medium while retaining the form of secondary particles. In contrast, in the granular stabilizer of the present invention, the powdery stabilizer is disintegrated into the into primary particles and the respective primary particles are surface-treated with the binder medium. This surface treatment is different from the so-called surface treatment of a metal and the treatment of surfaces of particles is meant. Accordingly, fine covering or coating of the binder medium on the surfaces of respective primary particles is caused, but the surface-treated product as a whole is still in the powdery state and is different from a granular product.

In the present invention, by surface-treating respective primary particles of the powdery stabilizer with the binder medium, even in this powdery state the surface-treated stabilizer is improved over the untreated powdery stabilizer in its surface characteristics and various powder characteristics.

For example, as illustrated in Examples given hereinafter, if the surface treatment is carried out by mixing tribasic lead sulfate with a wax under pulverizing conditions, the surface-treated powder becomes water-repellent and the surface characteristics are greatly changed. Furthermore, the surface-treated powder has an angle of repose much smaller than the untreated powder and its flowability is highly improved. Moreover, by this surface treatment, the dispersibility is prominently increased when it is incorporated into a chlorine-containing polymer. It is deemed that this effect is attained because strong aggregation of primary particles of the powdery stabilizer is prevented by the surface treatment covering described above, the surface characteristics of the powdery stabilizer are improved and the binder medium present in the form of the surface treatment covering promotes the dispersion of the powdery stabilizer in the form of primary particles.

Furthermore, if the powdery stabilizer is mixed with the binder medium under pulverizing conditions to surface-treat the powdery stabilizer in the form of primary particles with the binder medium, the composition of the powdery stabilizer and the binder medium is very homogeneous even microscopically, and segregation is completely prevented during transportation, storage or granulation. The composition of the final granular stabilizer is kept homogeneous in respective particles, among particles and among production lots.

Another characteristic feature of the present invention is that the powdery stabilizer is surface-treated with the binder medium in an amount smaller than the critical liquid absorption and granulation is effected with a very small amount of this binder medium used for the surface treatment.

The critical liquid absorption referred to in the instant specification and appended claims is determined according to the method for determining the oil absorption except that the critical liquid absorption is determined on a specific combination of the powdery stabilizer and binder medium used and the measurement is carried out in the state where the binder medium is in the form of a molten liquid. More specifically, the binder medium is added little by little to 100 g of the powdery stabilizer and the state of the mixture is observed while the mixture is kneaded at a temperature higher than the melting point of the binder medium. The point at which the particles of the powdery stabilizer are formed into one mass from the disintegrated state is found and the amount (g) of the binder medium added to this point is defined as the critical liquid absorption.

This critical liquid absorption has close relations to the characteristics of the powdery stabilizer used, for example, the particle size, particle structure, particle size distribution and bulkiness, and the melt specific gravity of the binder medium. A powdery stabilizer having a large bulk has a large critical liquid absorption, and as the melt specific gravity of the binder medium is large, the critical liquid absorption tends to increase.

In view of the foregoing, in the instant specification and appended claims, the value obtained by multiplying an oil absorption (ml/100 g) measured by using linseed oil, by the melt specific gravity (g/ml) of a binder medium used is adopted as the critical liquid absorption.

In order to surface-treat the powdery stabilizer in the form of primary particles with the binder medium, it is surprisingly important that the binder medium should be used in an amount of 2 to 15 parts by weight, especially 4 to 10 parts by weight, per 100 parts by weight of the powder stabilizer, which is smaller than the critical liquid absorption. Namely, if the binder medium is used in an amount larger than 15 parts by weight or larger than the critical liquid absorption, granulation is readily caused, even at the pulverizing and mixing step, and it becomes difficult to effect the surface treatment while disintegrating the powdery stabilizer into primary particles. If the amount of the binder medium is too small and below the above-mentioned range, however efficiently the pulverizing mixing may be carried out, it is difficult to uniformly surface-treat the respective primary particles, and also the granulation becomes difficult.

According to the conventional common sense, in order to perform the granulation by using a solid binder medium and melting this solid binder medium, it will be considered necessary to use the solid binder medium in an amount exceeding the critical liquid absorption. However, according to the present invention, only by surface-treating the powdery stabilizer in the form of primary particles with a solid binder medium in an amount smaller than the critical liquid absorption, preferably in an amount corresponding to 15 to 80%, especially 35 to 65%, of the critical liquid absorption, does it becomes possible to obtain a granular product having a homogeneous composition without causing scattering or blocking. Furthermore, since the amount of the binder medium added such as a wax, is reduced, such troubles as blooming and precipitation can be effectively eliminated and a resin composition in which the granular stabilizer is incorporated is prevented from being excessively lubricative.

In the present invention, since the solid binder medium is used in an amount smaller than the above-mentioned critical liquid absorption for the powdery stabilizer, pulverizing mixing of these components and subsequent granulation are very important.

For example, if a mixture containing the powdery stabilizer and the solid binder medium in an amount smaller than the critical liquid absorption is directly subjected to rolling granulation at a temperature higher than the melting point of the binder medium, extreme segregation is caused between the powdery stabilizer and the powdery binder medium, and, in the binder medium-rich portion, aggregation of particles of the binder medium and growth of these particles are readily caused. Accordingly, by this granulation method, there are formed small amount of the binder medium-rich granular product and a large amount of the powdery stabilizer containing a very small amount of the binder medium, each having a composition quite different from the starting recipe. Accordingly, the composition of the obtained granular product is extremely heterogeneous and extremely different from the starting recipe, and the granulation efficiency is extremely insufficient.

In contrast, if pulverizing mixing of the powdery stabilizer with the powdery binder medium is carried out prior to granulation according to the present invention, at the subsequent rolling granulation under shearing, segregation is prevented between the powdery stabilizer and the powdery binder medium and a granular product having the same composition as the starting recipe and being excellent in the flowability, the dispersibility and the resistance to scattering can be obtained at a high efficiency.

Stabilizers and stabilizer aids which satisfy the above-mentioned requirements may be selected from those customarily used in this field and may be used in the present invention. Preferred examples will now be described though the stabilizers and stabilizer aids that can be used in the present invention are not limited to those exemplified below.

I. Stabilizers

1. Lead salts, especially basic lead salts represented by the following formula:

$$nPbO \cdot PbX_{2/m} \qquad (1)$$

wherein n is a number of from 0.5 to 5, especially from 1 to 4, X stands for an inorganic acidic oxide anion (especially an anion of an oxyacid of phosphorus, sulfur or carbon) or an organic anion (especially a carboxylic acid anion), and m stands for the valency of the anion X, such as mono- to tetra-basic lead sulfates, dibasic lead sulfite, dibasic lead phosphite, white lead, basic lead phosphate, basic lead acetate, dibasic lead stearate, basic lead maleate, dibasic lead phthalate and basic lead tartrate.

Lead silicate having a composition represented by the following formula:

$$PbO \cdot pSiO_2 \qquad (2)$$

wherein p is a number of from 0.1 to 10, especially from 0.5 to 5, and lead oxides such as litharge, massicot, red lead and minium.

2. Hydroxides, basic salts and silicates of alkaline earth metals and zinc:

Hydroxides such as calcium hydroxide, magnesium hydroxide, zinc hydroxides and strontium hydroxides.

Basic salts having a composition represented by the following formula (oxide base):

$$MO \cdot qMX_{2/m} \qquad (3)$$

wherein M stands for an alkaline earth metal or zinc, X and m are as defined in the formula (1), and q is a number of from 0.1 to 10, especially from 0.5 to 5, such as basic calcium carbonate, basic magnesium carbonate, basic calcium stearate, basic zinc stearate and basic magnesium palmitate.

Silicates having a composition represented by the following formula (oxide base):

$$MO \cdot kSiO_2 \qquad (4)$$

wherein M stands for an alkaline earth metal or zinc, and k is a number of from 0.1 to 10, especially from 0.5 to 5.

Aluminosilicates, for example, synthetic zeolites such as zeolite A, zeolite X and zeolite Y, and partially or completely neutralized products and metal ion-exchanged products thereof (for example, calcium, magnesium or zinc ion-exchanged products).

3. Others:

Sodium sulfite, sodium thiosulfate, disodium phosphate, calcium sulfite and calcium monohydrogenphosphate.

II. Stabilizer Aids

As the stabilizer aid, there can be used inorganic stabilizers such as calcium carbonate, magnesium carbonate, aluminum hydroxide and hydrotalcite. Furthermore, the following organic stabilizers and stabilizer aids can be used.

1. Polyhydric alcohols:

Monopentaerythritol, dipentaerythritol, other polypentaerythritols, mannitol, sorbitol, glucose, fructose, trimethylol propane, polyethylene glycol having a molecular weight of, for example, 200 to 9,500, polypropylene glycol having a molecular weight of, for example, at least 1,000, polyoxyethylene-polyoxypropylene block polymers having a molecular weight of, for example, 1,900 to 9,000, and adducts of ethylene oxide or propylene oxide to a polyhydric alcohol such as glycerin, pentaerythritol, sorbitol or the like.

2. Phenols:

Alkyl gallates such as propyl, octyl and dodecyl gallates, guaiac fat, p-methoxyphenol, alkylated phenol, styrenated phenol, styrenated cresol, butylstyrenated cresol, phenylphenol, methyl salicylate, phenyl salicylate, p-tert-butylphenyl salicylate, methyl p-hydroxybenzoate, propyl p-hydroxybenzoate, hydroquinone monobenzyl ether, butylated hydroxytoluene, 2,5-di-tert-anyl hydroquinone, 4-hydroxymethyl-2,6-di-tert-butylphenol, 2,6-di-tert-p-phenylphenol, 4,6-dinonyl-o-cresol, butylated hydroxyanisole, 2,2'-bis(4-hydroxy)-propane (bisphenol A), polybutylated 4,4'-isopropylidene diphenol, 2,2'-methylene-bis-(4-methyl-6-tert-butylphenol), 2,2'-methylene-bis(4-ethyl-6-tert-butylphenol), 2,2'-methylene-bis(4-methyl-6-tert-octylphenol, 2,2'-methylene-bis(4-methyl-6-nonylphenol, 2,2-methylene-bis[6-(1-methylcyclohexyl)-p-cresol], a mixture of 2,2'-methylene-bis(4-methyl-6-nonylphenol) and 2,6-bis(2-hydroxy-3-nonyl-5-methyl-benzyl)p-pcresol, 4,4'-butylidene-bis(6-tert-butyl-m-cresol), tris(2-methyl-4'-hydroxy-5-tert-butylphenyl)-butane, tetrakis[methylene-3-(3',5'-di-tert-butyl-4'-hydroxyphenyl)propionate]methane, 1,3,5,-trimethyl-2,4,6-tris(3,5-di-tert-butyl-4-hydroxybenzyl)benzene, n-octadecyl-β-(4'-hydroxy-3',5'-di-tert-butylphenyl)-propionate, N-n-alkyl-N'-(carboxymethyl)-N,N'-trimethylenediglycine, 2-n-octyl-thio-4,6-di-(4'-hydroxy-3',5'-di-tert-butyl)phenoxy-1,3,5-triazine, thio-bis[methylbutylphenol], 4,4'-thio-bis[6-tert-butyl-m-cresol], 2,4,5-trihydroxybutyrophenone, 2-hydroxy-4-methoxybenzophenone, 2-hydroxy-4-n-octoxybenzophenone, 2,2'-dihydroxy-4-methoxybenzophenone, 2-hydroxy-4-methoxy-2'-carboxybenzophenone, 2-(2'-hydroxy-5'-methylphenyl)-benzotriazole, 2-(2'-hydroxy-3'-tert-butyl-5'-methylphenyl)-5-chlorobenzotriazole and 2-(2'-hydroxy-3',5'-di-tert-butylphenyl)-5-chlorobenzotriazole.

3. Nitrogen Compounds:

Ammonium higher fatty acid salts, ammonium citrate, urea, N,N-diphenylthiourea, hexamethylene tetraamine, 2-phenylindole, esters of β-aminocrotonic acid with such alcohols as 1,3-butane diol, 1,4-butane diol, 1,2-dipropylene glycol, thiodiethylene glycol and linear saturated alcohols, N,N'-diphenylethylene-diamine, N,N'-disalicylal-propylene-diamine and N,N'-di-o-toluyl-ethylene-diamine.

4. Phosphorus Compounds:

Tris(nonylphenyl) phosphite, 2-tert-butyl-α-(3-tert-butyl-4-hydroxyphenyl)-p-cumenyl-bis(p-nonylphenyl) phosphite, hydrogenated 4,4'-isopropylidene-diphenyl phosphate and tris(nonylphenyl) phosphite-formaldehyde condensate.

5. Sulfur Compounds:

Thiodipropionic acid, diethyl thiodipropionate, dilauryl thiodipropionate, dimyristyl thiodipropionate, distearyl thiodipropionate, laurylstearyl thiodipropionate and stearyl-(3,5dimethyl-4-hydroxybenzyl) thioglycolate phenothiazine The mixing ratio of the stabilizer to the stabilizer aid can be changed within a broad range, but ordinarily, the stabilizer aid may be used in an amount of 0.1 to 100 parts by weight per 100 parts by weight of the stabilizer.

Lubricants and lubricating stabilizers satisfying the above-mentioned requirements are used as the organic solid binder or dispersion medium. Furthermore, they may be used in combination with a chlorine-containing polymer or modifier resin. Suitable examples are described below.

I. Lubricating Stabilizers

High fatty acid salts (especially salts of saturated fatty acids having 8 to 22 carbon atoms), resin acid salts and montanic acid salts of various metals, for example, metals of the group II of the Periodic Table such as calcium, zinc, cadmium and magnesium, and aluminum and lead.

For example, there can be mentioned lead stearate, lead laurate, lead palmitate, lead montanate, lead abietate, calcium montanate, calcium stearate, magnesium stearate, zinc stearate and cadmium stearate.

II. Lubricants

1. Aliphatic Hydrocarbon Type Lubricants:

Synthetic paraffin, petroleum was, petrolatum, polyethylene wax and α-olefin wax.

2. Fatty Acids:

Higher fatty acids such as fatty acids derived from animal and vegetable oils and fats and hydrogenated products thereof, which have 12 to 22 carbon atoms.

3. Amides and Amines of Higher Fatty Acids:

Oleylpalmitamide, 2-stearomidoethyl stearate, ethylenebisfatty acid amides, N,N'-oleoylstearylethylene diamine, N,N'-bis(2-hydroxyethyl)alkyl ($C_{12}$–$C_{18}$) amides, N,N'-bis(hydroxyethyl)lauroamide, oleic acid reacted with N-alkyl ($C_{16}$–$C_{18}$) trimethylene diamine, fatty acid diethanol amines and di-(hydroxydiethyl)-diethylene-triamine monostearate ester of distearic acid.

4. Monohydric Alcohol and Polyhydric Alcohol Esters of Fatty Acids:

n-Butyl stearate, hydrogenated methyl resinate, di-n-butyl sebacade, dioctyl sebacate, pentaerythritol tetrastearate, sorbitol fatty acid esters, polyethylene glycol fatty acid esters, polyethylene glycol monostearate, polyethylene glycol dilaurate, polyethylene glycol mono-oleate, polyethylene glycol dioleate, polyethylene glycol coconut fatty acid diester, polyethylene glycol tall oil fatty acid diester, ethane diol montanic acid ester, 1,3-butane diol montanic acid diester, diethylene glycol distearate, and propylene glycol fatty acid diesters.

5. Triglycerides and Waxes:

Hydrogenated edible oils and fats, hydrogenated cotton seed oil, hydrogenated linseed oil, palm oil, glycerin 12-hydroxystearate, hydrogenated fish oils, beef tallow, spermaceti wax, montan wax, carnauba wax, beeswax, haze wax, monohydric aliphatic alcoholaliphatic saturated acid esters such as hardened sperm oil lauryl stearate and stearyl stearate, and lanolin.

6. Alkali Metal Salts of Higher Fatty Acids:

Sodium soaps.

7. Others:

Propylene glycol alginate and dialkylketone.

A resin modifier such as a compolymer of vinyl chloride and/or vinylene chloride with at least one comonomer selected from mono-olefins such as ethylene, propylene and styrene, diolefins such as butadiene, ethylenically unsaturated acids such as acrylic acid, methacrylic acid and maleic acid, esters, amids and anhydrides thereof, vinyl esters such as vinyl acetate, and acrylonitrile may be added to a chlorine-containing polymer together with the granular stabilizer of the present invention.

Mixing of the powdery stabilizer with the binder medium under pulverizing conditions can be performed according to various methods. For example, in the case of wet pulverizing mixing, the powdery stabilizer and the binder medium are mixed under pulverization in the presence of a solvent, and in the case of dry pulverizing mixing, the powdery stabilizer is dry-blended with the powdery binder medium in the absence of a solvent or the like under pulverization.

In each case, it is important that pulverization should be effected so that the powdery stabilizer is disintegrated into primary particles. For this purpose, there may be used a crusher, a sand grinder mill, an attriter, a high-speed shearing stirrer, a Tokyo atomizer, a Nara type pulverizer, a disc shaking mill, a vibrating ball mill and a rotary ball mill. Of course, two or more of these pulverizing means may be used in combination. In these pulverizing mixers, the powdery stabilizer is disintegrated into primary particles and simultaneously, the primary particles are surface-treated with the binder medium.

In the case of the former wet pulverizing mixing treatment, the binder medium is dissolved or dispersed in a solvent, the powdery stabilizer is dispersed in the resulting liquid to form a slurry, the slurry is supplied into a pulverizing mixer as mentioned above, pulverizing mixing is sufficiently carried out, and the solvent is distilled off under mixing or stirring conditions to obtain a surface-treated powder.

In order to prevent aggregation of the stabilizer particles, it is preferred that a non-polar solvent be used as the solvent, and a solvent capable of partially or completely dissolving the binder medium therein is especially preferred. Accordingly, aromatic solvents such as benzene, toluene and xylene or, aliphatic solvents such as n-hexane, n-heptane aliphatic butane and aliphatic cyclohexane may be used, though the present invention is not limited to these specific examples. The solvent may be used in an amount of 15 to 150 parts by weight per 100 parts by weight of the powdery stabilizer.

In the latter dry pulverizing mixing treatment, metered amount of the powdery stabilizer and the powdery binder medium are supplied into a pulverizing mixer as mentioned above, pulverizing mixing is carried out at a temperature lower than the melting point of the binder medium, and the resulting surface-treated powder is taken out from the mixer.

The degree of the pulverizing mixing depends on the intensity of pulverization and it is difficult to generally define the degree of the pulverizing mixing. However, since the degree of the surface treatment can be determined by testing the surface characteristics or the particle characteristics such as the dispersibility and flowability as pointed out hereinbefore, the treatment degree may be determined according to the kind of mixer used based on the results of these tests.

For example, when tribasic lead sulfate is mixed with lead stearate under pulverization, it is confirmed that with advance of the surface treatment of particles, (1) the particle size distribution is shifted toward the smaller particle size side, (2) the average particle size is reduced, (3) the shape of particles is changed to a spherical shape from a needle-like shape, (4) the water repellency is increased, (5) the angle of repose is decreased, (6) the dispersibility in a vinyl chloride resin is prominently improved and (7) the X-ray diffraction intensity is hardly changed.

The above-mentioned wet pulverizing mixing is advantageous in that complete covering of the primary particles with the binder medium is easily accomplished. However, this mixing method is disadvantageous in that the cost is increased by use of the solvent and removal of the solvent is necessary after mixing, and aggregation of the primary particles tends to occur when heating is carried out for removal of the solvent. In contrast, the dry pulverizing mixing is very advantageous because the treatment is very simple, though covering of primary particles tends to be incomplete.

In the present invention, the surface-treated powder is granulated at a temperature higher than the melting point of the organic solid binder or dispersion medium to obtain particles having an average particle size of 0.1 to 2 mm.

Various known granulation means may be adopted. However, since only a very small amount of the binder medium is contained in the surface-treated powder, the granulation product may preferably be obtained by the rolling granulation method. Not only an ordinary rolling granulator but also a mixer type granulator such as a Henschel mixer or a super mixer may be used for the rolling granulation. In the former apparatus, the machine wall is moved and in the latter apparatus, the powder is moved. However, both the apparatuses are in agreement with each other in the point where granulation is accomplished by the relative movement between the machine wall and the powder.

It is very important that this rolling granulation should be carried out at a temperature higher than the melting point of the binder medium. If this temperature is lower than the melting point of the binder medium, granulation is not accomplished at all, or the conversion to the granulation product is extremely low even if granulation is accomplished to some extent.

In the granulation according to the present invention, there is no difference of the composition between the granulation product and the ungranulated powder. Accordingly, since the granulation product having a predetermined particle size, which is formed at the granulating step, is recovered by sieving while the ungranulated powder is recycled to the granulator, all of the surface-treated powder can be finally recovered in the form of the granulation product. This is one of the prominent advantages attained in the present invention.

Of course, in the present invention, the granulation is not limited to the above-mentioned rolling granulation. For example, the granulation product can be prepared by kneading and extruding the surface-treated powder at a temperature higher than the melting point of the binder medium by a pelletizer or the like. Moreover, the intended granulation product can be obtained according to the fluidized bed granulation method or the like.

As is apparent from the foregoing description, in the granular stabilizer of the present invention, the primary particles of the powdery stabilizer are surface-treated with the organic solid binder or dispersion medium, and therefore, the granular stabilizer of the present invention has various advantages not attained in the conventional granular stabilizers.

The granular stabilizer of the present invention may be incorporated into vinyl chloride resins, various vinyl chloride copolymers, chlorinated polyethylene, chlorinated polypropylene and chlorinated vinyl chloride resins in amounts of 1 to 10 parts by weight per 100 parts by weight of the chlorine-containing polymer to improve the thermal stability.

The present invention will now be described in detail with reference to the following Examples that by no means limit the scope of the invention. Incidentally, in these Examples, all of "parts" and "%" are by weight unless otherwise indicated.

EXAMPLE 1

A granular stabilizer was prepared by selecting and using commercially available powdery tribasic lead sulfate ("STABINEX Tc" supplied by Mizusawa Kagaku Kogyo) as the powdery stabilizer.

The physical properties of the powdery tribasic lead sulfate ($3PbO \cdot PbSO_4 \cdot H_2O$) used were as follows.

PbO content: 88.6%
$SO_3$ content: 7.88%
$H_2O$ content: 1.78%
Fatty acid content: 1.54%
Bulk specific gravity; 2.6 cc/g
Average crystal size: 8.7 $\mu$
Critical liquid absorption: 10.3 g/100 g
Specific gravity: 7.1
Refractive index: 2.1
Water content (after drying at 110° C.): 0.2%

Commercially available powdery lead stearate ("STABINEX NC18" supplied by Mizusawa Kagaku Kogyo) was selected and used as the binder medium. The physical properties of this binder medium were as follows.

PbO content: 29.8%
Fatty acid content: 70.2%
Bulk specific gravity: 1.25 cc/g
Specific gravity: 1.32
Melting point: 108° C.

A dispersing stirrer customarily used in the field of paints (attriter Model 60SC supplied by Mitsui-Miike Seisakusho: capacity of 300 l; glass bead volume of 180 l; rotation number of 80 rpm) was charged with 150 kg of the powdery tribasic lead sulfate (STABINEX Tc) and 6.25 kg of the powdery lead stearate (STABINEX NC18), and 80 l of commercially available benzene of the industrial chemical grade was added as the solvent. The temperature was elevated to about 40° C. and dispersing agitation was conducted for 1 hour under shearing while maintaining the peripheral speed of the stirring rotor at 4.0 m/sec. The resulting slurry of the tribasic lead sulfate surface-treated with lead stearate, which was dispersed in benzene, was recovered and transferred to a high-speed shearing stirrer (super mixer Model SMG500 supplied by Kawada Seisakusho; capacity of 500 l) provided with a cooling pipe for recovery of benzene. Benzene was recovered by distillation under heating while gently rotating the stirrer so that the slurry was not scattered, whereby a powdery stabilizer comprising primary particles of the stabilizer surface-treated with lead stearate was prepared. In this Example, the starting powdery tribasic lead sulfate was already covered with 2.15% of lead stearate. The total amount of lead stearate as the dispersion medium was 6.66 parts per 100 parts of pure tribasic lead stearate (2.20 parts of lead stearate as the covering material and 4.26 parts of lead stearate compounded).

Figure 4:
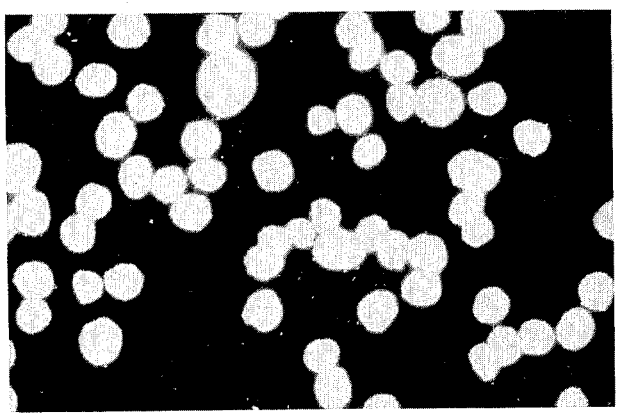
FIG.4 is a microscope photograph (60 magnifications) illustrating the particle structure of the granular stabilizer obtained in Example 1.

After removal of benzene by distillation, the electric current supplied to the rotating motor of the super mixer was increased, and the rotation of the super mixer was increased and maintained at 500 rpm. The powder in the mixer was heated at about 150° C. and the powder was granulated under rolling for 7 minutes. Then, the rotation of the mixer was reduced to 300 rpm and the temperature was lowered to 90° C., and the super mixer was rotated for about 1.5 minutes to adjust the particle size under cooling. Then, classification was carried out by using sieves of 74 to 500 $\mu$ to recover a granular stabilizer (see FIG. 4). It was found by the classification that the granular stabilizer comprised 26.9% of a fraction having a size larger than 500 $\mu$, 64.8% of a fraction having a size of 74 to 500 $\mu$ and 8.3% of a fraction having a size smaller than 74 $\mu$.

The measuring and testing methods adopted in this Example will now be described.

(a) Critical Liquid Absorption (g/100 g):

The oil absorption (OA; ml/100 g) of 100 g of the sample was measured according to the oil absorption-measuring method of JIS K-5101-1978 by using linseed oil. Separately, the specific gravity (SG; g/ml) of the organic binder or dispersion medium was measured at a temperature higher than the melting point thereof. The critical liquid absorption (LOA; g/100 g) was calculated according to the following formula:

$$LOA = OA \times SG \qquad (1)$$

(b) Analysis of Organic Solid Binder or Dispersion Medium in Granular Stabilizer:

Precisely weighed 1 g of the dry sample was charged in a 100-ml beaker and the sample was wetted with a small amount of ethyl ether. Then, 2 ml of 6N—$HNO_3$, 20 ml of 6N—$CH_3COOH$, 20 ml of water and 20 ml of 6N—$NH_4OH$ were added to the sample, and the mixture was sufficiently stirred and heated on a plate heater to form a solution.

The solution was cooled, and the insoluble organic solid binder or dispersion medium (stearic acid or wax) was recovered by filtration using filter paper No. 3. The recovered solid was transferred into a 100-ml separating funnel. Then, 10 ml of ethyl ether and 5 ml of 6N—$HNO_3$ were added to the solid to completely or partially dissolve the solid. The mixture was allowed to stand still for 20 to 30 minutes, and the aquaous phase was thrown away. The ether phase was transferred into a 40-ml horizontal weighing bottle which had been dried and weighed, and the inner wall of the funnel was washed with 10 ml of ether and the washing liquid was transferred into the weighing bottle.

Ethyl ether was naturally evaporated, and the residue was dried at 110° C. for 2 hours in a desiccator. The solid was taken out from the desiccator, cooled and weighed. The organic solid binder or dispersion medium content was calculated according to the following formula:

$$\text{Organic solid binder or dispersion medium content (\%)} = \frac{\text{weighed value (g)} - \text{weighing bottle weight (g)}}{\text{weight (g) of sample}} \times 100 \quad (2)$$

(In the case where the organic solid binder or dispersion medium was a fatty acid salt, the value of the fatty acid obtained from the above formula was converted to a value of the fatty acid salt.)

(c) Dispersibility of Granular Stabilizer in PVC:

A PVC sheet for the measurement of the dispersibility was prepared according to the following method under the following kneading and molding conditions.

A mixture comprising 100 parts of PVC (SUMILITE SX-11 supplied by Sumitomo Kagaku), 60 parts of DOP, 0.05 part of carbon black and 5.0 parts of the sample was kneaded at 160° to 165° C. for 5.5 minutes by a 3.5-inch roll (rotation number=28 rpm) to form a sheet having a thickness of 0.35 to 0.40 mm, a width of 12 cm and a length of 45 to 50 cm.

The dispersibility B was determined by the naked eye observation of particles having a size of 100 to 250 $\mu$ in a central 10 cm×25 cm portion of the molded sheet, and the dispersibility A was determined by the microscope observation of a central 5 cm=6 cm portion of the molded sheet.

More specifically, in the determination of the dispersibility B, the number of white specks having a size of 100 to 250 $\mu$ in the 250 cm² area on the surface of the molded sheet was counted, and the dispersibility B was expressed by this number (specks/250 cm²). In the determination of the dispersibility A, the number of white specks having a size of 25 to 100 $\mu$ in the 30 cm² area on the surface of the molded sheet by a microscope of 60 magnifications (Model EFM supplied by Nippon Kogaku Kogyo), and the dispersibility A was expressed by the values (specks/cm²) obtained by dividing the numbers of specs having a size of 25 to 50 $\mu$ and specks having a size of 50 to 100 $\mu$ by the area where the counting was done.

Since the insufficient dispersibility of the molded sheet was divided into the types of dispersibility A>>-dispersibility B and dispersibility A<<dispersibility B, the dispersibility could be evaluated by both the values A and B. When both the values were close to zero, it was judged that the dispersibility was good.

(d) Angle of Repose:

A chemical analysis glass funnel having an opening diameter of 100 mm was fixed so that the height of the funnel from the horizontal ground was 100 mm. Paper on which double circles having diameters of 50 mm and 100 mm, respectively, were drawn was placed on the horizontal ground below the fixed funnel. A sample powder was let to fall down on the center of the 50-mm circle drawn on the paper through the fixed funnel, and the cone of the deposited sample filled the 100-mm circle drawn on the paper, falling of the sample was stopped and the height (X; mm) of the cone was measured and the angle ($\theta$) of repose was calculated according to the following formula:

$$\tan \theta = \frac{X}{50} \quad (3)$$

A smaller value of the value $\theta$ indicates a better flowability of the sample powder.

(e) Chlorine-Catching Activity:

To 100 parts of a vinyl chloride resin (Vinyclon 4000M) was added 50 parts of DOP (supplied by Kyowa Hakko), and 5 parts of the granular stabilizer was added. The composition was sufficiently mixed and kneaded at 155° C. for 10 minutes by a kneading roller having a diameter of 3.5 inches to form a sheet having a thickness of about 0.5 mm. Three of the so-obtained sheets were piled and pressed at 170° C. for 10 minutes to form a sheet having a thickness of about 1 mm.

The sheet was cut into small pieces having a volume of about 0.5 mm³ and 2 g of these small pieces were charged in a test tube having a diameter of 1.5 cm. A Congo Red test paper wetted with glycerin was fixed to the mouth of the test tube in such a manner that the test paper did not touch the wall of the test tube. Then, the test tube was immersed in an oil bath maintained at 180° C. and the time required for hydrogen chloride to be formed by thermal decomposition of the vinyl chloride resin composition and change the color of the Congo Red test paper to blue was measured. The thermal stability by the chlorine-catching activity (HT) was evaluated based on the thus measured time (minutes).

(f) Volume Resistivity:

A composition comprising 100 parts of PVC (Vinyclon 4000M), 50 parts of DOP and 5 parts of the sample was kneaded at 155° C. by a roll having a diameter of 3.5 inches for 10 minutes to form a sheet having a thickness of 0.5 mm. Three of the so-obtained sheets were piled and pressed at 170° C. for 10 minutes to form a sheet having a thickness of about 1 mm. The sheet was allowed to stand still for 14 hours in a thermostat tank maintained at 25° C., and the volume resistivity ($\Omega$-cm) was measured by an ultra-super insulation resistance tester (Model 5M-10 supplied by Toa Denpa Kogyo).

(g) Charpy Impact Test:

A composition comprising 47.6 g of PVC (Geon 103EP) and 2.38 g (5 parts) of the sample was kneaded at 160° C. for 6 minutes by a roll having a diameter of 3.5 inches to form a sheet having a thickness of 0.6 to 0.7 mm. Two sheets were formed by kneading and molding for each sample. One molded sheet was divided into three equal parts. Six sheets thus prepared for each sample were press-molded in a press frame having a thickness of 0.3 cm.

According to the Charpy test method of JIS K-7111 for rigid plastics, a specimen No. 1 was prepared from the pressed sheet and the Charpy test was carried out by using a Charpy impact tester.

(h) Thermal Stability:

A composition comprising 100 parts of PVC (Geon 103EP) and 5.0 parts of the sample was kneaded at 160° C. for 5 minutes by a kneading roll having a diameter of 3.5 inches to form a sheet having a thickness of 0.5 mm.

The sample sheet was cut into a size of about 3 cm×about 10 cm, and the sample was placed in a gear oven maintained at 180° C. and exposed to this temperature condition. The state of discoloration by thermal degradation was examined at a prescribed interval. The discoloration was evaluated according to the scale of 8 grades, namely grade 0, grade 1, grade 2, grade 3, grade 4, grade 5, grade 6 and grade 7. Grade 0 indicates that the sample was not discolored at all, and as the discoloration advanced, the grade number increased up to grade 7 which indicated that the sample was completely blackened. The thermal stability was evaluated based on the degree of thermal degradation thus determined.

(i) Dust Scattering Ratio:

A 300-ml beaker was charged with 100 g of the sample, and the beaker was placed on a magnetic stirrer and the sample in the beaker was stirred at 60 rpm by using a rod-like glass vane having a length of 40 mm and a diameter of 7 mm. A dust measuring apparatus (supplied by Gakken) was set 15 mm above the beaker and the sample powder was sucked for 5 minutes at an air flow rate of 30 l/min. Thus, dusts formed by stirring of the sample were sucked in the measuring apparatus. The dusts adhering to a filter paper in the measuring apparatus were determined from the weight increase of the filer paper. The dust scattering ratio (%) based on the weight of the sample was calculated from the measured value.

The following comparative experiments were carried out so as to clarify the effects of Example 1 of the present invention.

Comparative Example 1C-1

The starting powdery tribasic lead sulfate (STABINEX Tc) used in Example 1 was directly used as the stabilizer.

Comparative Example 1C-2

The powdery mixture of the powdery tribasic lead sulfate and powdery lead stearate, which was used in Example 1, was directly subjected to rolling granulation in the super mixer at a temperature (150° C.) higher than the melting point of lead stearate without the surface treatment of the primary particles in benzene. The resulting granulation product having a particle size of 74 to 500 μ was used as the stabilizer.

Comparative Example 1C-3

The procedures of Comparative Example 1C-2 were repeated in the same manner except that rolling granulation was carried out at a temperature (90° C.) lower than the melting point of lead stearate. 500 μ was used as the stabilizer.

Comparative Example 1C-4

The procedures of Example 1 were repeated in the same manner except that at the surface treatment of primary particles in benzene, the amount incorporated of the powdery lead stearate was changed to 103% of the critical liquid absorption and the surface-treated powder was subjected to rolling granulation at 150° C. The resulting granulation product having a particle size of 74 to 500 μ was used as the stabilizer.

Comparative Example 1C-5

The procedures of Example 1 were repeated in the same manner except that the powder surface-treated in benzene was subjected to rolling granulation in the super mixer at 90° C., which was lower than the melting point of lead stearate. The resulting granulation product having a particle size of 74 to 500 μ was used as the stabilizer.

The preparation conditions adopted in the Example and Comparative Examples and the obtained test results are shown in Table 1.

TABLE 1

|  | Example No. 1 | Comparative Example No. | | | | |
| --- | --- | --- | --- | --- | --- | --- |
|  |  | 1C-1 | 1C-2 | 1C-3 | 1C-4 | 1C-5 |
| Amount Added of Binder Medium |  |  |  |  |  |  |
| g/100 g | 41.6 | 0 | 4.93 | 4.16 | 10.6 | 4.16 |
| Ratio (%) of critical liquid absorption | 40.4 | 0 | 47.9 | 40.4 | 103 | 40.4 |
| Yields (%) of Formed Particles (particle size distribution) |  |  |  |  |  |  |
| above 500 μm | 26.9 | — | 2.6 | 0.4 | 88.3 | 1.0 |
| 500–74 μm | 64.8 | — | 36.6 | 18.9 | 11.7 | 19.0 |
| below 74 μm | 8.3 | above 99.5 | 60.8 | 80.7 | 0 | 80.0 |
| Content (g/100 g) of Binder Medium |  |  |  |  |  |  |
| above 500 μm | 4.2 | — | 8.3 | 148 | 9.3 | 4.3 |
| below 74 μm | 4.3 | 0 | 4.2 | 2.3 | 0 | 4.0 |
| Dispersibility |  |  |  |  |  |  |
| A (specs/cm$^2$) 25–50 μm | 3.8 | 80.0 | 53.2 | 20.6 | 136.5 | 0.4 |
| A (specs/cm$^2$) 50–100 μm | 1.4 | 12.1 | 7.6 | 7.6 | 28.5 | 7.1 |
| B (specs/250 cm$^2$) 100–250 μm | 0 | 313 | 1500 | 1200 | 1125 | 0 |
| Angle of Repose |  |  |  |  |  |  |
| 500–74 μm | 33°18′ | — | — | — | 40°28′ | 38°15′ |
| below 74 μm | 33°6′ | 50°12′ | 42°15′ | 51°48′ | — | 43°0′ |
| Chlorine-Catching Activity (minutes) | 438 | 429 | 390 | 295 | 361 | 415 |
| Volume Resistivity (106 cm × 10$^{13}$) | 2.9 | 1.3 | 1.1 | 0.9 | 1.1 | 1.7 |
| Charpy Impact Value (kg · cm/cm$^2$) | 6.0 | 4.4 | 4.2 | 4.5 | — | — |
| Therman Stability |  |  |  |  |  |  |
| before exposure | 0 | 0 | 0 | 0 | 0 | 0 |
| after 30 minutes' exposure | 1 | 2 | 2 | 2 | 2 | 1 |
| after 60 minutes' exposure | 2 | 3 | 3 | 3 | 3 | 2 |
| after 90 minutes' exposure | 2 | 4 | 4 | 4 | 3 | 2 |
| after 120 97 exposure | 2 | 5 | 5 | 5 | 4 | 3 |
| after 150 minutes'exposure | 3 | 7 | 6 | 6 | 6 | 3 |
| Dust Scattering Ration (%) | 0.015 | 0.550 | 0.019 | 0.100 | 0.025 | 0.040 |

From the foregoing results, it is seen that the granular stabilizer of the present invention has the following characteristics.

(1) The angle of repose is reduced and the granular stabilizer has a good flow characteristic.

(2) The mixing ratio between the powdery stabilizer and the binder medium is constant and uniform irrespective of the particle size (irrespectively of whether the particle size is large or small).

(3) The particle size distribution is deviated to the small particle size side and the average particle size is present on the small particle size side. This means that the dispersibility in PVC is improved.

Figure 1:
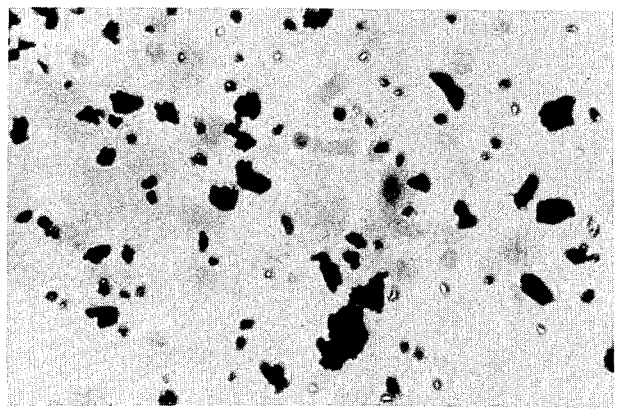
FIG. 1 is a microscope photograph (600 magnifications) illustrating the particle structure of tribasic lead sulfate used in Example 1.
Figure 3:
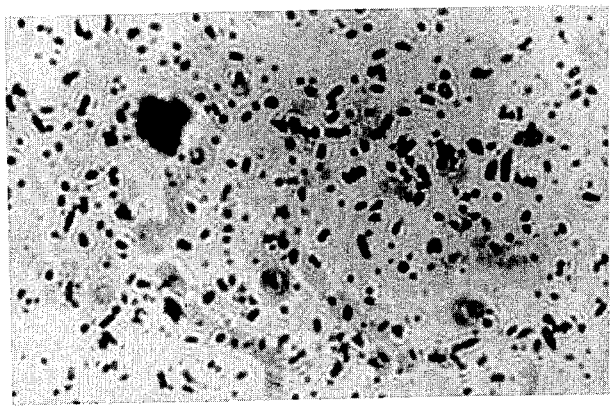
FIG. 3 is a microscope photograph (600 magnifications) illustrating a surface-treated powder (Example 1) obtained by subjecting tribasic lead sulfate shown in FIG. 1 to a pulverizing treatment in the presence of lead stearate.

(4) The shape of the crystalline particles of the stabilizer is changed to a spherical shape from a needlelike shape by mixing of the stabilizer with the binder medium under pulverization (see FIGS. 1, 2 and 3).

Figure 6:
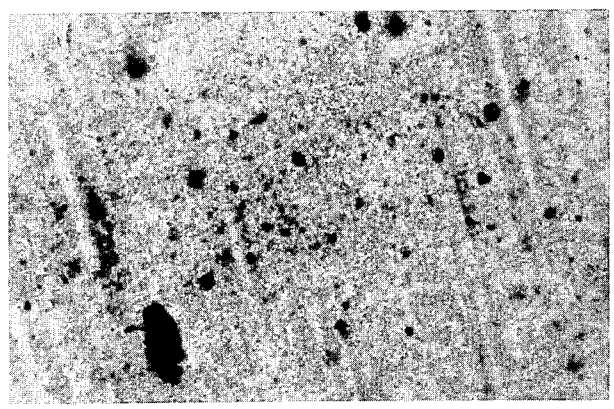
FIG. 6 is a microscope photograph (60 magnifications) illustrating the surface dispersion state in a vinyl chloride resin sheet in which the stabilizer of Comparative Example 1C-1 is incorporated.
Figure 5:
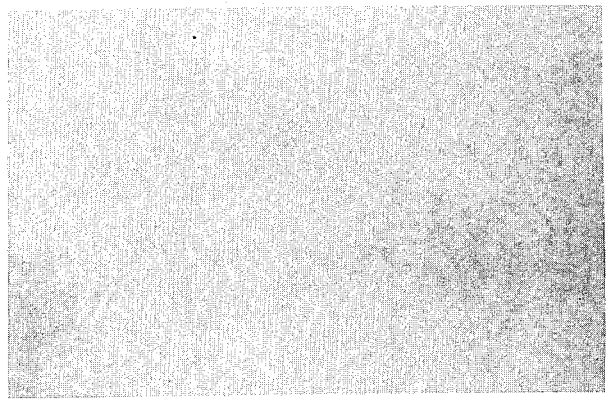
FIG. 5 is a microscope photograph (60 magnifications) illustrating the surface dispersion state in a vinyl chloride resin sheet in which the granular stabilizer of Example 1 is incorporated.

(5) The dispersibility in PVC is improved (compare FIG. 5 with FIG. 6), and the thermal stability and Charpy impact value are improved.

(6) The dust scattering ratio is extremely low.

EXAMPLE 2

Granular stabilizers differing in the composition were prepared and tested.

Dibasic lead phosphite (STABINEX D supplied by Mizusawa Kagaku Kogyo), lead silicate (STABINEX S supplied by Mizusawa Kagaku Kogyo) and tribasic lead sulfate (STABINEX Tc supplied by Mizusawa Kagaku Kogyo) were selected and used as the powdery stabilizer and the stabilizer aid was surface-treated with the binder medium in a solvent shown in Table 2 in the same manner as described in Example 1. The surface-treated powder was subjected to rolling granulation in a super mixer at a temperature higher than the melting point of the binder medium to obtain a granular stabilizer. In the case of sample 2-6, the stabilizer powder comprising primary particles having a particle size of 8.7 μ was surface-treated according to the dry method different from the method adopted in Example 1. Namely, the powdery stabilizer was mixed with the binder medium in the absence of a solvent under water cooling by the super mixer at a rotation number of 500 rpm for 3 minutes and then mixing under pulverization was carried out in an atomizer. The mixed powder comprising the primary particles surface-treated with the binder medium was then subjected to rolling granulation at a temperature higher than the melting point of the binder medium in the same manner as described in Example 1.

The obtained results are shown in Table 2.

TABLE 2

| | Sample No. | | | | | |
|---|---|---|---|---|---|---|
| | 2-1 | 2-2 | 2-3 | 2-4 | 2-5 | 2-6 |
| Powdery Stabilizer [parts] | | | | | | |
| STABINEX D | — | — | — | [100] | — | — |
| STABINEX S | — | — | — | — | [100] | — |
| STABINEX Tc | [100] | [58] | [75.0] | — | — | [100] |
| Stabilizer Aid (calcium carbonate) [parts] | — | [42] | [25.0] | — | — | — |
| Binder Medium [parts] (% to liquid absorption) | | | | | | |
| Luvax 2191 | [1.68] | — | — | — | — | — |
| S-200 | (28.2) | (26.0) | (50.5) | (26.0) | (6.3) | (38.6) |
| | | [2.06] | — | 2.37 | 3.5 | |
| STABINEX NC18 | | (47.2) | | (47.2) | (14.9) | |
| | (3.04) | [5.09] | [8.51] | [6.63] | [11.5] | [41.6] |
| Dispersibility | | | | | | |
| A (specs/cm²) 25–50 μm | 11.0 | 22.6 | 14.0 | 0.5 | 0.4 | 33 |
| A (specs/cm²) 50–100 μm | 0.8 | 1.4 | 0.3 | 0.1 | 5.0 | 7.1 |
| B (specs/250μm) 100–250 μm | 0 | 0 | 0 | 0 | 0 | 5 |
| Angle of Repose | | | | | | |
| 74–500 μm | 33°40′ | 30°16′ | 31°10′ | 31°50′ | 36°54′ | 33°0′ |
| below 74 μm | 33°0′ | 30°7′ | 32°15′ | 31°28′ | 37°38′ | 33°10′ |
| Chlorine-Catching Activity (minutes) | 440 | 405 | 435 | 457 | 150 | 400 |
| Volume Resistivity (Ω · cm × 10¹³) | 3.0 | 2.5 | 2.1 | 3.5 | 3.1 | 1.8 |
| Charpy Impact Value (kg · cm/cm²) | 6.2 | 7.0 | 7.4 | 6.0 | 7.8 | 5.0 |
| Therman Stability | | | | | | |
| before exposure | 0 | 0 | 0 | 0 | 0 | 0 |
| after 30 minutes' exposure | 1 | 1 | 1 | 1 | 1 | 1 |
| after 60 minutes' exposure | 2 | 2 | 2 | 2 | 2 | 2 |
| after 90 minutes' exposure | 2 | 3 | 2 | 2 | 3 | 3 |
| after 120 minutes' exposure | 2 | 4 | 3 | 3 | 4 | 5 |
| after 150 minutes' exposure | 3 | 6 | 5 | 4 | 5 | 7 |
| Dust Scattering Ratio (%) | 0.025 | 0.040 | 0.010 | 0.030 | 0.015 | 0.077 | lizer.

Among commercially available lubricants for vinyl chloride resins, low-molecular-weight polyethylene having a melting point of 80° C. (Luvax supplied by Nippon Seiro), glycerin stearate having a melting point of 57° to 63° C. (Rikemar S-200 supplied by Riken Vitamin) and the above-mentioned lead stearate (STABINEX NC18 supplied by Mizusawa Kagaku Kogyo) were selected and used as the organic solid binder or dispersion medium.

Furthermore, commercially available powdery calcium carbonate ("Softon 1200" supplied by Bihoku Funka) was used as the stabilizer aid.

According to the recipe shown in Table 2, the powdery stabilizer or the powdery mixture of the stabilizer From the foregoing results, it is seen that if a powdery stabilizer or a mixture of a powdery stabilizer and a stabilizer aid (calcium carbonate) is mixed under pulverization with a binder medium according to the wet or dry method to form primary particles of the stabilizer surface-treated with the binder medium and granulation is then carried out at a temperature higher than the melting point of the binder medium, a granular stabilizer having a reduced dust scattering ratio, a good dispersibility in PVC and other excellent properties can be obtained.

We claim:

1. A process for the preparation of a granular stabilizer for chlorine-containing polymers, which comprises the steps of mixing a powdery stabilizer for chlorine-containing polymer, or a mixture of said powdery stabilizer with a powdery stabilizer aid, said powdery stabilizer being substantially infusible at the processing temperature, with an organic solid binder medium selected from the group consisting of metal soap, wax and mixtures thereof in an amount of 2 to 15 parts by weight per 100 parts by weight of said powdery stabilizer or said powdery mixture under dry pulverizing conditions at a temperature lower than the melting point of the organic solid binder, whereby the powdery stabilizer and the organic solid bonder are mixed to thereby form primary particles of the powdery stabilizer, and (1) the particle size distribution is shifted toward the smaller particle size side, (2) the average particle size is reduced, (3) the shape of particles is changed to a spherical shape from a needle-like shape, (4) the water repellency is increased, (5) the angle of repose is decreased, (6) the dispersability in a vinyl chloride resin is improved and (7) the x-ray diffraction intensity is hardly changed; the amount of the organic solid binder medium corresponding to 15 to 85% of the critical liquid absorption of said powdery stabilizer or said powdery mixture, defined as the amount of the organic binder added to 100 g of the powdery stabilizer, with kneading and at a temperature higher than the melting point of said binder, to the point at which the particles of said powdery stabilizer are formed into one mass from the disintegrated state, to surface-treat respective primary particles of said powder with said organic solid binder medium, and granulating the surface-treated powder into particles having an average particle size of 0.1 to 2 mm at a temperature higher than the melting point of the organic solid binder medium.

2. The process of claim 1, wherein said organic solid binder medium is mixed in the proportion of 4 to 10 parts by weight, per 100 parts by weight of said powdery stabilizer or said powder mixture.

3. The process of claim 1 wherein said organic solid binder medium is present in an amount corresponding to 35 to 65% of the critical liquid absorption of said powdery stabilizer or said powdery mixture.

4. The process of claim 1, wherein in said mixing step the powdery stabilizer or powdery mixture undergoes disintegration into substantially spherical primary particles while simultaneously being surface-treated with said organic solid binder medium.

5. The process of claim 1, wherein in said mixing step metered amounts of said powdery stabilizer or powdery mixture and said organic solid binder are supplied to a pulverizing mixer and pulverizing mixing is carried out at a temperature lower than the melting point of said binder.

6. The process of claim 1 wherein the powdery stabilizer is selected from the group consisting of a basic lead salt represented by the formula:

wherein n is a number of from 0.5 to 5, X is an organic anion or an inorganic acidic oxide anion, and m is the valency of the anion X,
and a lead silicate of formula:

wherein p is a number of from 0.1 to 10.

7. The process of claim 1 wherein the step of granulating comprises rolling granulation.

8. A process for preparing flowable and non-scattering granulated lead salt stabilizers which can be easily dispersed in chlorine-containing polymers, said process comprising
(A) dry copulverizing powdery lead salt stabilizer with from 2 to 15 parts by weight, per 100 parts by weight of powdery stabilizer, of an organic solid binder medium selected from the group consisting of metal soap, wax and mixtures thereof, said dry copulverizing being carried out at a temperature lower than the melting point of the binder medium, the amount of the binder medium being less than the critical liquid absorption amount of the powdery stabilizer whereby the powdery stabilizer is simultaneously pulverized into individual primary particles and the primary particles are uniformly coated with the organic solid binder medium, and
(B) granulating the coated primary particles at a temperature higher than the melting point of the organic solid binder medium, whereby the coated primary particles are fusion bonded through the organic solid binder medium into free-flowing, non-scattering granules having an average particle size of from 0.1 to 2 mm, and whereby the composition of the granules is substantially the same as the composition of the coated primary particles.

9. The process of claim 8 wherein the amount of the organic solid binder medium is in the range of from 4 to 10 parts by weight, per 100 parts by weight of powdery stabilizer and in an amount of from 15 to 85% of the critical liquid absorption amount of the powdery stabilizer.

10. The process of claim 8 which comprises dry copulverizing the powdery lead salt stabilizer and a powdery stabilizer aid with the organic solid binder medium, the amount of the binder medium being less than the critical liquid absorption amount of the mixture of powdery stabilizer and powdery stabilizer aid.

11. A process for the preparation of a granular stabilizer for chlorine-containing polymers, which comprises the steps of:
(A) admixing (I) at least one powdery stabilizer for chlorine-containing polymers, selected from the group consisting of a basic lead salt represented by the following formula:

wherein n is a number of from 0.5 to 5, X is an organic anion or an inorganic acidic oxide anion, and m is the valency of the anion X,
and a lead silicate represented by the following formula:

wherein p is a number of from 0.1 to 10, with (II) an organic solid binder medium selected from the group consisting of metal soaps, waxes and mixtures thereof, said organic solid binder medium being present in an amount of 2 to 15 parts by weight per 100 parts by weight of said powdery stabilizer and in an amount corresponding to 15 to 85% of the critical liquid absorption of said powdery stabilizer, said critical liquid absorption (LOA) being defined by the following formula:

$$LOA = OA \times SG$$

wherein OA represents the oil absorption (ml/100 g) of the powdery stabilizer measured according to the method of JIS K-5101-1978 by using linseed oil, SG represents the specific gravity (g/ml) of the organic solid binder medium measured at a temperature higher than the melting point thereof, and LOA represents the critical liquid absorption (g/100 g);

(B) copulverizing the mixture at a temperature lower than the melting point of the organic solid binder under such pulverizing conditions that the powdery stabilizer is simultaneously pulverized into individual primary particles and said particles are uniformly coated with the organic solid binder, thereby to form coated primary particles of the powdery stabilizer having such characteristics that
(1) the particle size distribution is shifted toward the smaller size side,
(2) the average particle size is reduced,
(3) the shape of the particles is changed to a spherical shape from a needle-like shape,
(4) the water repellency is increased,
(5) the angle of repose is decreased,
(6) the dispersibility in vinyl chloride resin is improved, and
(7) the X-ray diffraction intensity is hardly changed, and (C) granulating the coated primary particles at a temperature higher than the melting point of the organic solid binder medium, whereby the coated primary particles are fusionflowing, non-scattering granules having an average particle size of from 0.1 to 2 mm, and whereby the composition of the granules is substantially the same as the composition of the coated primary particles.

12. The process of claim 11, wherein in said mixing steps said binder is dissolved or dispersed in a solvent, said powdery stabilizer or powdery mixture is dispersed in the resulting liquid to form a slurry, pulverizing mixing is carried out and the solvent distilled off with mixing and stirring to obtain the surface-treated powder for granulation.

13. The process of claim 12, wherein said solvent is a non-polar solvent and is present in an amount of 15 to 150 parts by weight, per 100 parts by weight of said powdery stabilizer or powdery mixture.

* * * * *